United States Patent [19]

Cummings, Jr.

[11] Patent Number: 5,051,193

[45] Date of Patent: Sep. 24, 1991

[54] WASTE WATER TREATMENT PROCESS

[75] Inventor: Paul W. Cummings, Jr., Worcester, Mass.

[73] Assignee: Aeration Engineering Resources Corporation, Worcester, Mass.

[21] Appl. No.: 550,613

[22] Filed: Jul. 9, 1990

Related U.S. Application Data

[63] Continuation of Ser. No. 246,446, Sep. 18, 1988, abandoned, which is a continuation-in-part of Ser. No. 836,947, Mar. 6, 1986, abandoned.

[51] Int. Cl.$^5$ .............................................. C02F 3/20
[52] U.S. Cl. .................................. 210/752; 210/754; 134/3; 134/22.12; 134/39; 261/122
[58] Field of Search ............... 134/3, 22.11, 22.12, 134/29, 170, 39-41; 210/620-627, 758, 220, 754, 750, 752; 261/122, DIG. 70

[56] References Cited

U.S. PATENT DOCUMENTS

| Re. 33,177 | 3/1990 | Schmit et al. | 210/754 |
|---|---|---|---|
| 2,684,330 | 7/1954 | French | 210/8 |
| 2,686,138 | 8/1954 | Klein | 134/15 |
| 2,826,209 | 3/1958 | Klein | 134/70 |
| 3,150,007 | 9/1964 | Kovachy | 134/4 |
| 4,238,244 | 12/1980 | Banks | 134/22 |
| 4,382,867 | 5/1983 | Schmit et al. | 210/754 |
| 4,402,758 | 9/1983 | Hobbs | 134/3 |
| 4,419,141 | 12/1983 | Kunkel | 134/22.12 |

OTHER PUBLICATIONS

Manual of Practice No. 5, "Air Diffusion in Sewage Works", Federation of Sewage & Industrial Wastes Assn.; pp. 48-62 (1952).

Primary Examiner—Tom Wyse
Attorney, Agent, or Firm—Shlesinger, Arkwright & Garvey

[57] ABSTRACT

A treating process is shown for removing cloggants from the pores and surfaces of aeration diffuser elements used in an activated sludge treatment process or the like. In this process, an acid solution is made to fill the aeration piping network, is fed through the plenum chambers that support the respective elements to be treated, and into the pores in said elements for reacting with the cloggants to be removed. The process is performed so that the acid solution fills the pores and contacts the surfaces of the diffusers and the plenums and the submerged piping network. The acid solution is reacted with the cloggants and is then agitated in contact with the diffusers and with the cloggants in the pores and on the surfaces of the diffusers to rejuvenate these elements.

17 Claims, 2 Drawing Sheets

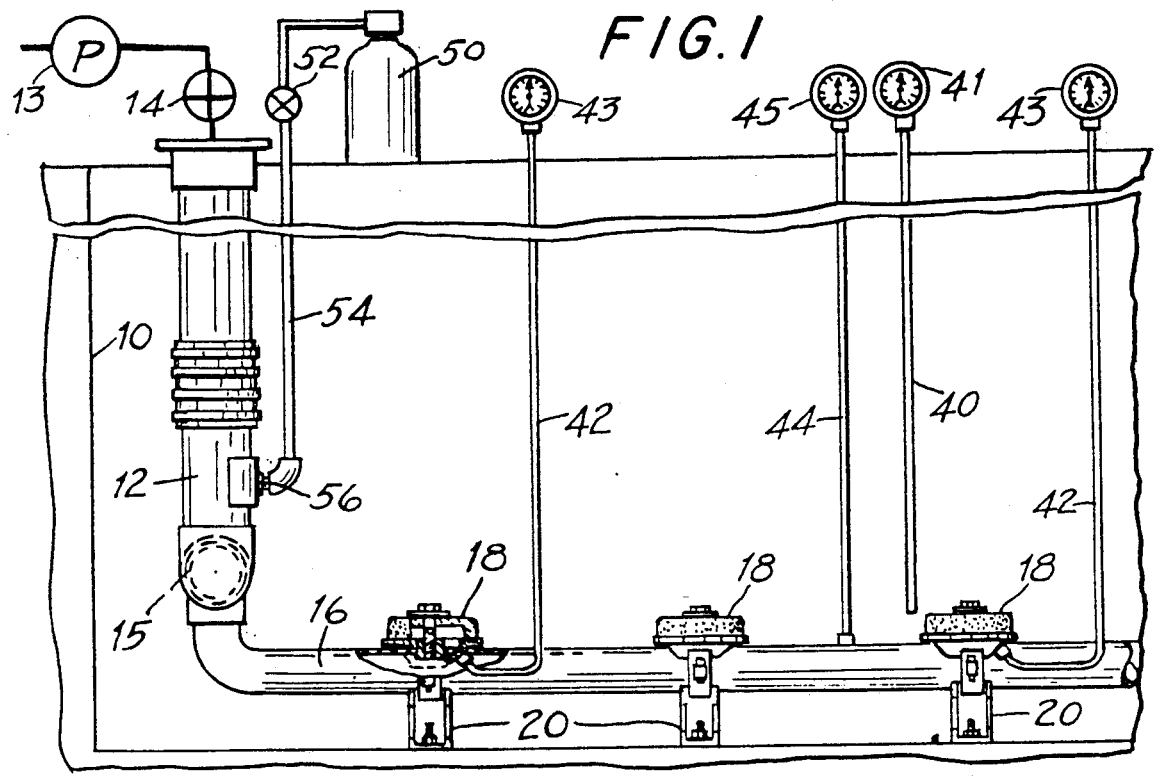
FIG. 1
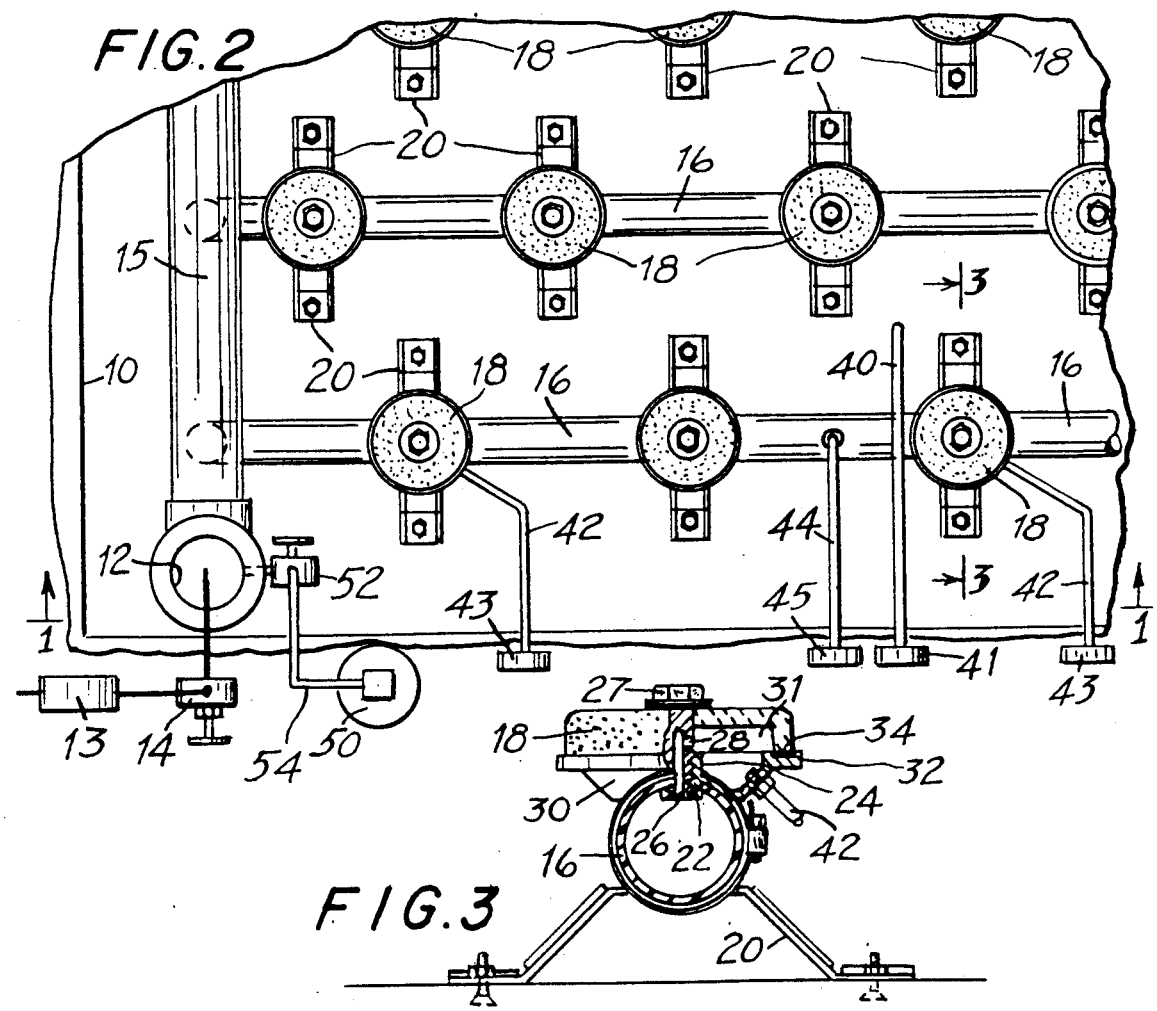
FIG. 2
FIG. 3

WASTE WATER TREATMENT PROCESS

This application is a continuation of Ser. No. 07/246,446 filed by Paul Cummings on Sept. 19, 1988, now abandoned, which was a continuation-in-part of his earlier application Ser. No. 07/836,947 filed Mar. 6, 1986, now abandoned.

TECHNICAL FIELD

This invention relates to an aeration treatment system and more particularly to a process for rejuvenating the diffusers in an activated sludge or other process diffusion system.

BACKGROUND AND INFORMATION DISCLOSURE STATEMENT

The following U.S. patents illustrate the best art known to the inventor at the time of the filing this application.

| United States Letters Patent | |
|---|---|
| 1,755,614 to Seil | April 22, 1930 |
| 2,684,330 to French | July 20, 1954 |
| 2,686,138 to Klein et al | August 10, 1954 |
| 2,815,943 to Lamb | December 10, 1957 |
| 2,826,209 to Klein et al | March 11, 1958 |
| 3,150,007 to Kovachy | September 22, 1964 |
| 3,880,965 to Dudis et al | April 29, 1975 |
| 4,238,244 to Banks | December 9, 1980 |
| 4,382,867 to Schmit et al | May 10, 1983 |
| 4,419,141 to Kunkel | December 6, 1983 |

OTHER REFERENCES

Manual of practice No. 5, "Air Diffusion in Sewage Works", Federation of Sewage and Industrial Association, pp 48–62 (1952).

Sanitaire Diffuser Maintenance—In place Gas Cleaning System, published by the Water Pollution Control Corporation of Milwaukee, Wis., April 1984.

These prior art cleaning means for diffusers and cleaning procedures for other aeration devices include French who proposes to burn the cloggants out of the pores and from the surface of diffusers with an oxyacetylene flame which would leave the ash residue from any oxidized organic deposits in the pores. Klein '138, suggests using a detergent and water jets to remove the foulants. He discusses the known use of chlorine circulated through the diffuser system but suggests that such a process does not adequately remove the deposits. Klein '209 also discusses the inadequacies of the prior art cleaning processes that make use of strong acid solutions that are so strong as to dissolve the soil or to disperse the soil in sufficiently fine particles as to pass through the extremely fine pores of the diffusers but which are also so strong that they carbonize and fix the accumulated organic materials so that this residue becomes lodged in and on the diffuser elements. He proposes another cleaning procedure making use of high pressure water jets.

In a related art, Kovachy discloses using nascent hydrofluoric acid on stone surfaces to remove accumulated surface dirt by reacting the acid with silicates and carbonates in the composition of the stone. His invention is concerned with a cleaner that frees the nascent acid directly on the surface to be cleaned, to which the cleaner has been applied like a paint to produce a microscopic surface reaction. The reaction products are then flushed from the surface being cleaned with water or steam.

Industrial apparatus found in nuclear power plants acquire deposits and become corroded. Various acids and other chemical cleaning agents are flushed through the systems from time to time to remove these cloggants. Banks suggests that a gas such as carbon dioxide be dissolved in water under super atmospheric pressure to carry the cleaning chemicals so that the hydrostatic pressure can be raised and lowered to release the dissolved $CO_2$ to agitate the flushing fluids while the cleaning action proceeds.

Siel shows an aeration device having a soft pliable or porous material in the form of a wall or envelope over a pipe in an aeration device for treating sewage or other processes for the gas purification of liquids. In this patent the porous material is vibrated by the air supply to mechanically detach solid material which lodges on the tubes.

Schmit et al discloses the process of cleaning diffusers used in an activated sludge process by pumping hydrogen chloride gas through the treating gas distribution system so as to flow through the open pores in the diffusers. The cleaning process is initiated from time to time or is used continuously during the sewage aeration treatment process depending upon the operating pressures prevailing throughout the system.

Lamb discloses a sewage aeration treatment system wherein a plurality of flexible, porous tubes are each individually supported on its respective rigid air supply pipe. The air is forced into the pipes through a supply network that includes a quick acting valve to open up the air pressure supply or cut it off to allow the tube to collapse to break away the solid material that may accumulate on the walls or in the pores of the tubes.

Dudis et al describes the use of flexible porous tubes for distributing air bubbles into a sewage treatment pond. Elongated flexible tubes extend throughout the pond, the surface of the tubes being smooth which minimizes the depositing of and buildup of material or particles on the surface thereof to thereby avoid closing the pores. It is stated in col. 6 line 64+, that "In addition, slight pulsing of the air supply as a natural result of the air supply pump by other produces continuous flexing of the tube to help minimize the deposition of particles" etc. Also in col. 7 line 20+ it is noted that "the tapered or converging relationship of the deflector members (forming a part of the flexible aeration system) reduces the possibility of the unit vibrating at a resonate frequency which is sometimes produced in some units by the supply pumps".

Kunkel shows how to clean viscous substances from labyrinthine channel systems by using a liquid solvent through the system. The solvent, having gas bubbles dispersed throughout its mass with an additional pulsing gas, is injected into the solvent dispersed into the channel system to produce additional agitation.

The activated sludge sewage treatment processes discussed in certain of the patents cited above, are used for rendering sewage wastes innocuous. Generally a large mass of the wastewater to be treated is aerated by bubbling minute air bubbles that may include another treating gas, through the diffuser into the mass. For that purpose, a number of diffuser elements are integrally mounted to a gas delivery duct work system arranged below the mass of sewage being aerated such that the treating gas is forced into the aqueous mass through the diffusers and is divided into small bubbles as the air flows through the pores of the diffusers. These bubbles enter near the bottom of the mass to be treated and slowly rise to the surface. As some of the gasses in the bubbles react with the sludge mass, some organic and inorganic foulants and other insoluble compounds may deposit out of the aqueous mass onto the surface or in the pores of the diffusers. Some of the orgabnic residues contain living organisms that can produce slime and other forms of matter than ca progress into the pores of the diffusers. These deposits can gradually build up on the surfaces and in the pores of the diffusers, restricting the flow of air into the wastewater.

As stated in the cited patents, it has been found if and when the restriction occurs it is necessary from time to time to rejuvenate these diffuser elements. The most useful of the known procedures used heretofore to eliminate such deposits, is to force a flow of chlorine or other acid gas into the treating gas (usually air) distribution network and through these porous media. The chlorine or acid gas has been found to react with the living organisms clogging the pores and also to dissolve the inorganic residue which has formed.

This procedure, however, making use of a relatively expensive and hazardous supply of hydrochloric or other acid gas has been found to flow mainly through the open pores of the diffuser being cleaned such that not all of the residue clogging the diffusers is brought into contact with the gas. Any pores in the diffuser being rejuvenated that have become totally blocked do not enjoy a flow of hydrochloric or other gas. These completely blocked passages remain clogged. Also some of the smaller partially clogged pores that might otherwise be open to a cleansing gas flow are filled with fluid by capillary action, and unless the pressure of the cleaning gas is sufficiently high as to blow out these pores, they remain closed and untreated because the hydrochloric or other acid gas cannot overcome the capillary forces that prevail in these passages.

The Manual of Practice No. 5 expounds on the operation and maintenance of a sewage treatment system which employs diffuser domes for distribution of the treating gas throughout the sludge being treated. So far as this reference is relevant to the present invention, it teaches acid cleaning of diffusers by draining the tank or lagoon and manually applying an acid solution to the sludge side of the diffusers.

The gas cleaning diffuser maintenance method discussed in the Sanitaire publication is concerned with the cleaning method patented in U.S. Pat. No. 4,382,867. It is to be noted that this publication has attached thereto a two page notice advising the user to be well aware of the risks inherent in use of this system which can result in "serious injury or death" if the very toxic, corrosive cleaning gasses are not handled properly. This notice cautions the user to instruct all personnel as to the risks involved and concerning the proper maintenance of the equipment at all times, including also the necessity for establishing and frequent review and upgrading of a safety program. The notice emphasizes that the safety program is necessary and the employer has the duty to see that it is "FOLLOWED".

The Sanitaire manual includes a description of the equipment required and instructions relative to proper use of the apparatus for performing the patented gas cleaning process. The use of anhydrous HCl is recommended and the apparatus and method for its use is described including reference to its highly toxic nature and the steps that must be rigidly adhered to when making use of the process to avoid injury. The instructions suggest that proper emergency procedures be cleared with the local Fire Department, for example, in case of an accident happening.

DISCLOSURE OF THE INVENTION

It is generally accepted that the typical cloggants that are deposited out of the aqueous mixture of sludge being aerated in an activated sludge treatment process, where foulants may collect upon the air diffusers and clog their pores, are mainly unstable and/or dissolve in the presence of an acid. The present disclosure describes a series of simple steps adapted to be used from time to time to attack such cloggants so that they may be dissolved and pushed out of the pores of the diffusers including those filled with fluid by capillary attraction. After a proper reaction has been completed on the diffusers, the reaction products are washed away from substantially all of the pores and surfaces of the porous diffusers. These diffusers remain in situ completely submerged during the rejuvenation process.

A system is here shown that is built into the aeration gas distribution network for feeding an acid liquid or gas into the treating gas distribution network for delivery to the diffusers to be rejuvenated. The acid, liquid or gas, flows to selected ones or to all of such diffusers susceptible to clogging in an amount to cause the treating gas and acid mixture to fill the pores in the diffusers and fill the plenum chambers upon which they are mounted. The acid liquid or gas flow is then cut-off and the treating gas pressure within the network is reduced. Back water from the aqueous sludge confined over the diffusers flows into and through the pores and into the distribution piping and plenum chambers to mix with the acid liquid or gas contained in the treating gas flow. When the backflow water combines with the acid in the treating gas, pressure is reinstated (preferably in a pulsing manner) to force the acid liquid into the pores of the diffusers, at which point the pressure is discontinued. The acid solution then reacts with the cloggants to free them from the internal pores and from surfaces of the diffusers being treated. The acid liquid may be forced into the diffusers by an application of gas or liquid pressure one or more additional times if necessary to clean the diffusers to the desired degree. After a quiescent time period to permit the back water flow and the acid-cloggant reaction to be substantially completed or to exhaust the acid content of the pores, the aeration network system is again activated in a manner to produce a pulsating agitating effect on the acid solution as it is being forced from the plenum chambers and the open and capillary pores of the diffusers. The reaction products and the remaining acid solution is forced into the aqueous mass of sludge in the holding tank. Following thereafter, a further quantity of acidified liquid is forced into the diffuser pores to continue the reaction to remove cloggant materials. When the cloggant has been fully reacted with the acid, the treating gas only is applied to the system. Thus the activated sludge treatment process over the rejuvenated diffusers is reactivated with an improved flow of treating gas bubbles into the sludge.

The prior art processes, specifically the Schmit et al method, teach a continuous uninterrupted flow of gas be it treating gas or a mixture of treating gas and cleaning gas. In fact Schmit et al goes so far as to recommend increasing the pressure as compared to the initial start up pressure so that there is what the patentees call an "enhanced pressure differential" when the cleaning step is commenced, the most preferred "enhanced pressure differential" being 24 inches of water gauge above the pressure when the diffusers are clean. However to operate a system at such an increase in pressure the system would have to have the capacity to operate at an additional pressure of 24 inches of water gauge over the pressure required to operate the system during the treating process in order to increase the flow rate to 2-3 SCFM. Most existing treatment systems do not have compressor capability of that capacity.

The present invention, by contrast, does not need such high powered compressors because the invention process does not require the continuous passage of cleaning medium through the diffusers but rather only requires that the liquid cleaning medium be made to contact the clogged pores in the diffusers. Thus a substantial cost savings in equipment is realized through the utilization of the invention process.

Another impressive and unexpected result of the invention process using an aqueous solution of HCl as compared to Schmit et al's gaseous HCl is the cost savings attained by the elimination of some equipment. When gaseous HCl is used such equipment as regulators, gas cylinder scales, flow meters, cylinder handling equipment and cylinder deposits are required and typically cost about $10,000 per installation and do not last very long because of the more severe corrosive effect of gaseous HCl. The use of the preferred liquid acid method of the present invention eliminates that cost.

Operating costs per se for the rejuvenation of the aeration domes of an average installation are substantially reduced by the use of the present invention as compared to the Schmit et al process. Cleaning with gaseous HCl at current prices costs from about $0.436 per diffuser to $0.288 per diffuser, depending on the size of the system. Using an aqueous HCl solution, the cost of doing the same cleaning job varies from $0.08 to $0.069 per diffuser.

The highly corrosive conditions which occur within the delivery components of the Schmit et al gas cleaning technology are completely avoided with the use of the liquid acid modification of the herein disclosed invention. Gaseous HCl, at 600 psi must be controlled by gas regulators to about 30-50 psi and then down to about 8 psi. However, the regulators recommended by Schmit et al have been found to require replacement or a thorough going service within a few months of start-up of the cleaning facilities to avoid the possibility of gas leaks developing from the extremely corrosive gas used. The manufacturer warrants the equipment for only 90 days from first use. This presents an economic and safety burden for the customer which is avoided by the use of the preferred form of the liquid acid method of this invention.

The Manual of Practice No. 5 reference discloses the operation and maintenance. Maintenance of the diffuser elements when they become clogged involves completely draining the tank or lagoon followed by the hand application of an aqueous HCl solution to the surface of the diffusers. The results reported in the reference were poor and this is supported by the fact in the thirty four years since publication of the Manual of Practice No. 5, the suggested cleaning process has not been used to any extent. The invention cleaning process by contrast, returns badly clogged diffuser elements to their original pre-use condition.

IN THE DRAWING

FIG. 1 is a partly broken away and schematic sectional side elevation taken on line 1—1 of FIG. 2, showing a portion of an activated sludge aeration tank, the gas distribution network and the aeration diffusers;

FIG. 2 is a top plan view of the tank of FIG. 1;

FIG. 3 is a view taken on line 3—3 of FIG. 2, showing how a typical diffuser may be supported over the gas distribution network.

DETAILED DESCRIPTION

Figure 4:
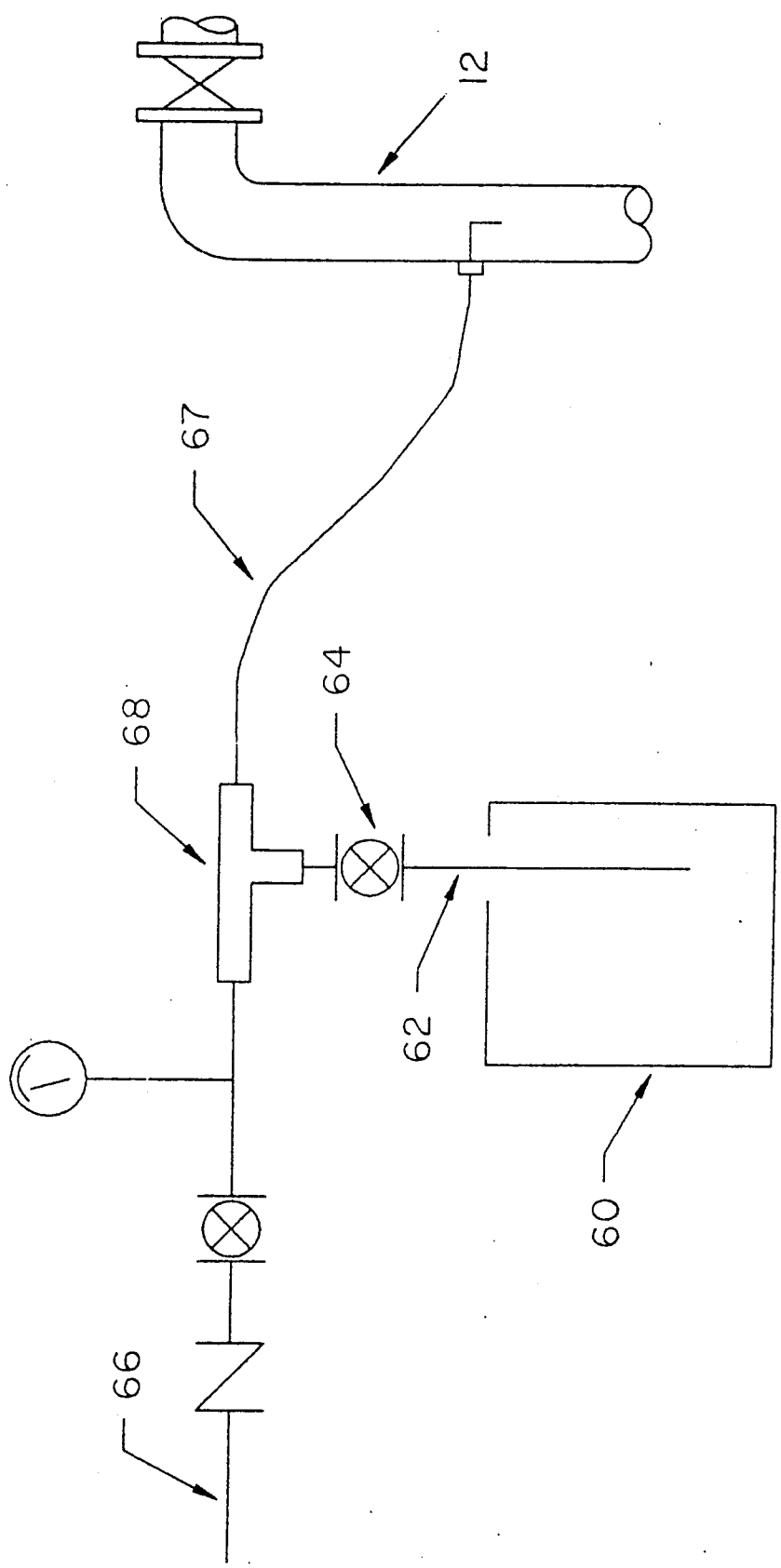
FIG. 4 is a diagrammatic representation of an apparatus for performing a modified form of the invention.

A typical activated sludge treatment system such as is shown in the drawings usually includes a number of aeration tanks. The dimensions of a tank are not critical but typically tanks may be 30'×30'×15' deep, but can be larger in area and any depth up to 30' deep. The tanks are filled with an aqueous sludge. A suitable air or other treatment gas distributing piping network is built into the tank that includes a drop leg 12 that is connected to an air pump 13 and valve 14 shown diagramatically in FIGS. 1 and 2. The drop pipe feeds the treating gas under a pressure from 0.2 to 2.0 psi greater than the pressure exerted by the liquid but usually in a range of 6 to 10 psi into a horizontal main header 15 disposed along one side of the bottom of the holding tank 10. A plurality of smaller horizontally disposed branch headers 16 are connected to the main header. Each of the branch headers being adapted to deliver any gas or liquid pumped into this gas distribution network into a plurality of air diffusers 18 mounted over the branch headers 16.

The branch headers are suitably supported on a plurality of pipe supports 20 and each of such branch headers has a series of apertures 22 along the center line of its upper surface. Seated on top of the branch headers and surrounding each aperture 22, there is a closed housing member 30 that forms a plenum chamber 31 that is sealed by a diffuser 18 that is mounted on housing 30 to complete the chamber 31. For this purpose, the housing 30 has a circular seat 32 facing upwardly for receiving a downwardly facing section 34 integral with the diffuser that is adapted to be sealed against the seat 32 when the centrally disposed bolt 27 is tightened into plug 24. Each one of the apertures is adapted to have a threaded plug element 24 integrally mounted therein for cooperating with the threads 26 of the bolt 27, the lower portion of the stem of the bolt being hollow. At the upper end of the hollow portion of the stem of the bolt there is an opening 28 passing through the wall of the stem so that air or any gas delivered under pressure into the air distribution system can flow from the branch header 16 through the hollow portion of the bolt and out through opening 28 into the plenum chamber 31. Other means of diffuser attachment and orifice gas flow control are also possible.

A plurality of diffusers 18 are provided to be mounted over each one of the series of apertures 22 disposed along the top of the several branch headers 16. Such an arrangement provides a multiplicity of diffusers spaced rather uniformly over the bottom of the holding tank 10 to produce the flow of air or other gas treatment bubbles that are released into the aqueous sludge held in the tank. In a typical 30'×30' tank, there may be as many as 312 diffusers uniformly positioned over the bottom surface of the tank.

While the above describes one well known structure for use in an aeration system for an activated sludge treatment process, it is merely typical of a number of such systems, some of which may make use of differently shaped or mounted diffusers but all of which diffusers have similar plenum chamber supports covered by porous types of body structures. All such sewage treatment systems require the distribution of minute bubbles of air or other treating gas to flow upwardly through the sludge being treated, the bubbles being formed when the treating gas is pumped through the gas distribution system under pressure to flow through the network for feeding the air or other gas to the underside of such known porous diffuser elements to be released into the aqueous sludge mass.

As the treatment process proceeds, certain insoluble oxidation products and sedimentary particles may be deposited on and in the diffusers. It also happens that certain of such deposits include living microorganisms that may grow and gradually accumulate in the pores of the diffusers to at least partly block the flow of air or other treating gas passing therethrough. Ultimately, if these foulants or cloggants are not removed, the diffusers may become plugged or covered to the point so as to inhibit the proper aeration of the sludge mass. Other such deposits may cover the surface of the diffusers, not necessarily increasing back pressure, but causing the small bubbles to coalesce to the detriment of the process requirements.

By measuring the several air pressures that prevail at various points throughout the distribution network, it is possible to determine when a back pressure is being built up behind the diffuser elements thus indicating that there has been an unwanted restriction of the flow of air or treating gas through the diffusers. To determine when such blocking occurs the typical system here shown may include two or three randomly positioned bubble tubes 40 through which air is pumped at low volumes under pressure in order to provide an indication on pressure guage 41 of the pressure head, caused only by liquid depth, against which the air or treating gas being diffused through the diffuser element must be pumped. An air pressure reading is also made through several randomly positioned conduits 42 to determine the actual air or gas pressure on guage 43 prevailing in the typical plenum chamber 31 and likewise other conduits 44 and gages 45 similarly randomly situated are connected to several of the branch headers 16 for determining the pressure in those zones of the treatment system. Depending upon the readings on the respective pressure guages 41, 43, and 45, a reliable estimate can be made as to the clogged condition of the several porous diffuser elements distributed throughout any given tank in the system. The diffusers which have been coated by foulants can be observed to produce unusual aeration patterns on the surface of the aqueous liquid.

When it has been determined that the diffuser elements are approaching the stage where they have become sufficiently impaired as to possibly interfere with the adequate treatment of the sludge, an aggressive liquid acid treatment process is initiated to render the cloggants water soluble such that the reaction products can be flushed free from the diffuser element surfaces and from their pores. After the diffusers have been subjected to the liquid acid rejuvenating treatment for a sufficient time period to loosen most or all of the cloggants, the flow of treating gas through the network is reestablished to clear the diffusers of the acid and reaction products for continuing the activated sludge treatment program.

The acid treatment of the diffusers in the system here shown is accomplished by feeding a liquid acid or water soluble acid gas such as hydrogen chloride into the already flowing stream of treating gas being forced into the drop leg 12 to flow into the header 15 and all, or by operating valve means not shown, selected ones of the branch headers 16.

In one form of this invention a relatively pure form of a soluble acid gas from any suitable supply 50 is pumped or flows by its own pressure through valve 52 into conduit 54 and to distributing head 56 that feeds the gas into the drop leg. Depending upon the capacity of the sludge treatment tank, the gas flow is continued for a time period of about 20 seconds for each 100 diffusers in the tank or along a particular header and for a longer time if necessary so that the treating gas from pump 13 with the gas mixed therewith, will reach all of the diffuser elements to be rejuvenated, in order to fill their open pores with the mixture containing the soluble acid gas. After all or the selected ones of the branch headers 16, their respective plenum chambers 31 and the open pores of the diffuser elements have been filled with the mixed treating gas and acid, valve 14 in the treating gas supply or a valve (not shown) in the individual header is closed and the valve 52 in the acid gas supply system is closed. When the gas flow into the selected plenums 31 of the diffusers being treated is cut-off, the pressure in these plenums drops and water in the sludge mass over the diffusers is allowed to back flow through the diffusers into such plenums 31. A vent may be opened to facilitate rapid water infiltration. The back flow water mixes with the water soluble acid gas in the pores of the diffusers and in the plenums, and in all of the submerged piping which pores and plenums and piping gradually become filled with this acid solution.

When the back flow of water into the plenums and piping has continued for a sufficient time to substantially fill the plenum chambers and piping, the treating gas and gas flow is again initiated for a period of about 30 seconds to force the acid solution into the open pores of the diffuser and to cause the acid solution in the plenum to be flushed against any plugged up, but water filled pores, and to be agitated against the cloggant in any completely closed pores. Then the treating gas flow and acid gas flow are again shut off for a time period to allow the acid solution in the plenum chamber, in the pores, and on the surface of the diffuser elements, to further react with the cloggants. It may be desirable during this relatively quiescent reaction time period to produce just sufficient pressure within the piping network system to maintain a continuous liquid acid contact with all of the air flow passages and surfaces of the diffusers exposed on their undersides to the acid solution in their respective plenums. Such fluid pressure can be produced in the distributing network that will assure flow of the acid solution through openings 28 in the hollow bolts so that the flow of acidified water will move slowly through the diffusers being rejuvenated.

It has been found, when upon initiating a liquid or gas flow again after a quiescent period within the gas distribution network, that the frictional conditions which prevail in the piping gas system cause a gas and/or liquid pulsing action to take place that causes successive pressure waves to proceed down the individual branch header or headers 16 to which the newly pressurized gas and/or liquid flow is being admitted. It has been observed for example, in a treating tank where the aqueous sludge mass just covers all of the diffusers, that when the treating gas flow process is begun, the first row of diffusers nearest the main horizontal header 15 will show a row of air bubbles, then the second row becomes activated, then the third row, etc. This ripple effect has been observed to last for at least several minutes as successive rows or successive pressure ripples follow one another along the header. The supply of gas seems to bounce within the headers 16 of the network system for at least a few minutes as first one row and then the next row of diffusers etc. become alternately energized and deenergized yielding alternating "slugs" of gas and water pulsing throughout the network.

This phenomenon is utilized in the process herein described, to cause the acid solution in the plenums and in pores of the diffusers being rejuventated to be agitated within the pores of and around the surfaces of these diffusers. The agitation of course promotes a more complete and faster reaction between the acid and cloggants whereby to speed up and enhance the desired rejuvenation process. The molecular dispersion of acid in the capillary pores is also promoted by this agitation, whereby a most complete and thorough scrubbing of the diffusers is accomplished.

After a second quiescent time period of between 1 minute and several hours, depending upon the particular rate of chemical reaction with the cloggant, is allowed to transpire wherein to allow the cloggants to be as fully reacted as possible with the acid solution in the pores and on the surface of the diffusers, the gas treatment flow from pump 13 is reestablished and the acid gas supply is cut-off. When the aeration treating gas flow is started again any acid solution in the plenums and in the pores of the diffusers, is blown clear through the pores and all of the reacted cloggant products are driven into the sludge mass. The rejuvenated diffuser elements will have become reactivated to continue the sludge treatment process. The process is repeated as many times as required to achieve the desired degree of cleaning.

With the above described method it is seen that none of the pores of the diffuser element become dried out as when only a gas passes therethrough and none of the capillary pores are by-passed during performance of the acid treating step, since the acid solution surrounds all the pores filled with water. By reason of the molecular motion within the acid solution itself and also when the acid is mechanically agitated against the diffuser elements a more efficient rejuvenation of the diffusers results. The acid solution is held in a quiescent state around all of the exposed surfaces of the pores in the diffusers such that the molecular activity with the acid solution effects as complete a dispersion of the acid as is possible on the surface of the diffuser and in all of its pores since even capillary pores that might otherwise be blocked with water loaded cloggants are subjected to the acid reaction whereby to attack the cloggants within such pores so that they are reopened. In addition, the periodic agitation of the acid solution in contact by means of the liquid or gas pulsing effect with the diffusers, maximizes the rejuvenation process.

In this process, the acid treatment accomplishes the desired rejuvenation of the diffusers with a minimum expenditure of acid liquid or gas which is pushed into the network in an amount needed only to produce the desired acid treating solution. The liquid form of treatment of the cloggants with the acid solution is thus inherently more effective than the gas flow-through procedure used heretofore wherein the gaseous form of acid flows only through the already open pores and is lost in the aqueous sewage pond and does not always effectively reach any of the cloggants in the closed capillary pores.

In making use of one form of the present method for rejuvenating clogged diffuser elements, a liquid form of an acid solution is formed directly in the plenums to produce the desired acid solution for reaction with the cloggants to be removed. After the acid solution is produced by the back flow of water from the sludge mass above the diffusers, the acid liquid or gas flow in this invention is cut-off, thus minimizing the necessity of wasting additional acid liquid or gas. Such a system will reduce the need for centralized complicated hazardous gas piping, valves, and safety shut-off apparatus, such as are required for handling a larger compressed acid gas supply that would otherwise be required to maintain a continuous chlorine or acid gas flow.

The description above refers to a system wherein a liquid acid for cleaning the pores of the diffusers is formed in situ, by allowing the back flow of water from the sewage pond to infiltrate the pores in the diffusers for dissolving a soluble acid gas that has been forced into the air passages of the diffusers, which dilute acid that is formed when the gas dissolves in that water, reacts with the deposits that tend to clog the pores.

In a preferred operation of the herein disclosed liquid acid cleaning system, when the cleaning operation is to be performed, rather than allowing a back flow of water from the sewage pond to fill the pores of the diffusers to be cleaned, a liquid acid is prepared above the ground and is fed into the aeration piping system to be delivered to the diffusers to fill the pores to be cleaned.

In the use of this preferred form of liquid acid cleaning method, the diluted liquid acid supply from the supply above the ground level is fed into the section of the aeration piping system that supports the diffusers to be cleaned or to the entire system if all the diffusers are to be cleaned at one time. To initiate this dilute liquid acid cleaning process, the air flow to the group of diffusers to be treated with the liquid acid is first reduced to about 0.25 SCFM. As shown in FIG. 4, if all of the diffusers in the system are to be cleaned, the liquid acid is delivered to the aeration system together with the air supply through the drop pipe 12 to flow along header 15 and into branch headers 16 that support the diffuser until all the headers 16 in the system are filled with the liquid acid from the above ground supply. As the dilute liquid acid fills the system, the air flow to the diffusers is gradually reduced until it is entirely cut off. However, a pressure is maintained behind the liquid acid in the header 15 and/or pipes 16 to force the liquid acid up through all the plenum chambers 31 and against the under side of the diffusers and the pressure behind the liquid acid then forces this acid into the open pores of the diffusers. The volume of the acid needed to just fill the header 15 and pipes 16 and the plenum chambers of all the diffusers being cleaned can be predetermined, since the volume of all of the air flow passages of the system is known. Or if desired, the sewage pond can be watched as the acid is being filled into the aeration system to observe when the air bubbles are cut off and then it is known that the system is full of the liquid cleaning acid up to the entrance to the apertures 26 to the plenum chambers. Then it is necessary to supply only an additional volume of liquid acid to fill the plenums and air passages of the diffusers being cleaned.

When the entire system to be cleaned has been filled and the air passages through the diffuser have been filled with the liquid acid that has been pumped into the system being cleaned under some slight pressure, the air pressure supply is cut off but sufficient pressure is maintained by liquid that is filled into the drop pipe 12 up to the level of the water in the pond or an equivalent pressure is maintained behind the liquid acid in a portion of a system that is being cleaned so as to preclude any back up flow of fluid from the sewage pond into the air passages of the diffusers. Then the water/acid solution is allowed to stand in place in the diffusers to react with the cloggants in the passages of the domes being cleaned. It is to be noted that the molecular motion of the components in the acid solution that fills all of the open passages in the diffusers being cleaned, causes the acid to not only react with the cloggants in those passages but also drives the acid into adjacent passages that are filled with water but may have been closed off with cloggants and that might not otherwise be open to the flow of the incoming acid as the system is being filled. This molecular motion is effective to distribute the liquid acid solution into all of the spaces that are moist and forces the liquid acid to effectively react with nearly all of the cloggants distributed throughout all of the passages of the domes being cleaned. The liquid acid reacts with the cloggants to loosen them from their bonding with the walls of the passages. In those instances, where a particularly stubborn cloggant in a closed passage is encountered, it should be observed that the liquid acid that is infiltrated into that passage remains therein after the cleaning process has been terminated with respect to the remaining open passages, whereby to possibly loosen the offending cloggant while the remaining passages of that diffuser have been returned to their active aeration duty.

After the acid has been pumped into the system to fill the passages in the diffusers of the domes being cleaned, the acid solution is allowed to remain in place for several hours to permit the dilute liquid acid reaction with the cloggants to proceed, but about every fifteen minutes or so, an additional small supply of dilute acid is fed into the drop pipe 12 to force fresh liquid acid into the pores of the diffuser being cleaned. After this intermittent reaction period has been completed, the air flow is gradually reestablished by building up the air pressure to force air into the system being cleaned at a rate of up to 2.5 SCFM in order to clear the liquid acid from all of the aeration piping system and all of the diffusers. It will normally take an hour or more to drive all of the liquid acid out of the system being cleaned. All of this liquid is driven from the piping system, into the plenums and through the now cleaned air passages of the diffusers and into the sewage pond.

The solution of the soluble acid in water is incompressible and the forced flow of this solution through the rigid walls of the air passages through the diffusers, thoroughly scrubs these walls to remove the reacted cloggants from the passages. A further action that takes place during the performance of this step of blowing the acid from the system, involves the use of the mechanical agitation that takes place throughout the entire mass of the incompressible liquid being pumped through the diffusers as the air supply is being reestablished. It is well known that during the beginning of the build-up and air flow in such piping systems as are used in the aeration sewage treatment method, inherently, a pulsation of the fluid flow takes place. When this pulsating air pressure supply is used to drive the liquid acid through the air passages of the domes, the agitated incompressible liquid mechanically abrades the fixed rigid walls of the air passages to positively eliminate all the loosened cloggants remaining in the liquid filled passages. Also, this mechanical agitating effect produces a more complete chemical reaction between the acid and the cloggants by forcibly exposing all portions any unreacted cloggants remaining in the passages to the action of fresh incoming acid. This agitated pumping action also tends to drive fresh liquid acid into any passages that remain fully clogged after the normal reaction period has been terminated.

The cleaning process can usually be completed satisfactorily with a single reaction period that includes the intermittent addition of fresh fluid every fifteen minutes or so to permit the liquid acid that forces fresh liquid acid into the domes to react with the cloggants. If deemed necessary, however, a series of two or more agitated pumping and reaction periods can be performed to remove particularly stubborn cloggants that may be encountered in some operations.

The herein described liquid acid in situ cleaning process for clearing the clogged pores of the domes in an aeration sewage treatment process, provides an improved cleaning action making use of molecular agitation and a mechanical scrubbing action with an incompressible liquid against the rigid walls of the air passages in a dome being cleaned, to remove cloggants that may have accumulated over time. The liquid acid is first pumped into the passages to react with and digest the bulk of normal cloggants found in these passages and the forced pumping and vibratory action exerted against the walls of the passages and the loosened cloggants as the residual liquid acid is pumped from the system, effectively forces all of the cloggant material out of these passages and into the sewage pond.

This cleaning procedure provides for a relatively safe process for pumping a dilute liquid acid solution through an aeration system for cleaning the aeration domes in a place. A corraercial muriatic acid and water solution may be used in this process and, of course, use of such an acid solution does require reasonable care in the use thereof, so that it does not corrode any equipment or cause injury to an operator, but no special high pressure equipment or complicated procedures are involved in this preferred cleaning process for handling the liquid acid solution.

Referring to FIG. 4, a diagrammatic representation of an apparatus that could be used for this process is shown that includes a conventional carboy 60 that provides a source for the commercial 38% muriatic acid for introduction into a stream of flowing water from water pipe 66 to form the dilute solution having a pH of 1 or 2 that is to be used. The carboy has a PVC feed conduit 62 connected thereto that includes a plastic valve 64 for controlling the flow of the concentrated acid to the PVC venturi pump 68 located above the carboy for forming the dilute liquid 10% acid solution that flows through a plastic pipe 67 for feeding the dilute acid into the usually stainless steel or PVC drop pipe 12 for delivery to the remaining PVC headers in the aeration piping system. Recalling that water or a dilute supply of the liquid acid is filled into the drop pipe 12 up to the level of the liquid in the sewage pond to prevent any backflow of liquid from the pond into the air passages of the domes and into the plenum chambers in the performance of this form of the invention, the liquid acid is fed into the aeration piping system shown in FIGS. 1 and 2 until the air flow is cut off when the headers 16 are filled. At this point the calculated volume of liquid will have been pumped into the system and the pressure will be maintained in the down pipe 12 or its equivalent when only a limited area of the diffuser field is being cleaned, the pressure being just sufficient to force the dilute liquid acid solution into the air flow passages of the domes to be cleaned. Thereafter, as explained above, the drop pipe 12 is then filled with dilute acid up to the level of the sewage pond.

A more sophisticated system for the delivery of a compressed HCl gas to a water jet pump in the down pipe 12 can be conceived of by those skilled in this art that could provide equipment for the safe control of a soluble acid gas to be dissolved in the water to form the required dilute acid solution, with a minimum of exposure of the personnel using the process to the gas, as compared with other known systems. Such apparatus does not form the basis for any of the claims in this application and need not be discussed herein.

The cleaning process is usually performed when the economics of the operation of the system indicate that clogging is present. Some aeration sewage treatment plants have been operated for years without requiring the cleaning of the domes, but depending upon the contents of the sewage flow, cleaning may be required as often as several times a year. The cost of power used to drive the air blower means for the aeration process, of course, increases as the domes begin to clog up. A chart can be developed to equate the increasing cost of the power used by the blower means to the cost of the performance of the cleaning process, which chart can be mounted on an automated meter device to show when the power cost is equal to or exceeds the cost of performing the cleaning process, at which junction, the herein described dilute liquid acid cleaning process should be undertaken. After the cleaning cycle has been completed, the blower power consumption should be returned to a substantially normal level for unclogged domes to thus indicate the successful cleaning of the domes. Other conditions may be monitored if desired to determine when the cleaning process should be performed.

As compared with a process for cleaning domes by direct exposure of the domes to an acid gas alone, which requires the use of much more complicated gas handling equipment for delivering a constant flow of a corrosive acid gas through air passages leading to, and for the cleaning of the aeration domes in place, it is apparent that great savings in operating costs can be realized in the use of this herein disclosed liquid acid cleaning process. When using the present process, a more efficient use of the acid is accomplished and inherently a much less dangerous procedure is involved. Simultaneously a more effective cleaning operation is performed on the domes by reason of the molecular and mechanical agitation inherent in the use of this system. The use of a dilute acid solution in water is to be encouraged in order to promote the desired chemical reaction as compared with a gas cleaning process wherein the continuous flow of the HCl gas, for example, tends to dry out the cloggants that then cannot react as well with the pure gas provided for the cleaning of the minute pores in the domes, which drying action is accentuated because, when a concentrated HCl gas is used, for example, it is deliquescent and thus absorbes the moisture from the walls of the air passages as it flows through the passages it is supposed to clean and the desired chemical reaction between the acid and the cloggants is inhibited.

As above indicated, all of the diffusers can be treated simultaneously, or if desired, an alternate treating method could be utilized wherein the diffusers along a selected one or selected ones of the branch headers 16 are rejuvenated while the remaining diffusers served by other drop legs 12 continue the aeration treatment of the sewage mass. Other modifications of the invention disclosed herein may occur to those skilled in the art that will fall within the scope of the following claims.

I claim:

1. In an aeration sewage treatment process wherein sewage is dispersed in a aqueous pond and is rendered innocuous by passing a treating gas through a distribution system that includes a conventional assembly of above ground and underwater gas feed conduit means that functions to force a treating gas to be released near the bottom of the pond from outlets supported adjacent the bottom of said pond, the outlets taking the form of a plurality of multi-pore diffusion elements submerged in the pond, each of which individual diffuser element is supported over its respective plenum chamber that forms a part of said conduit means, which plurality of porous diffuser elements and their respective plenum chambers are carried by that portion of said gas distribution system that forms a network including piping that is submerged in said aqueous pond; and during the performance of which treating process acid reactive cloggants may form deposits in the pores of and on the surfaces of said diffuser elements the cloggants which form in said pores having a tendency to add to the back pressure of the aqueous pond against said elements and against which the treating gas must be pumped because the cloggants cause a progressive restriction of the flow of treating gas through said diffusion elements and the cloggants which deposit on the surface of the elements possibly causing an additional deterioration of the aeration process, the improvement comprising: rejuvenating said diffusion elements in situ from time to time by removing at least a portion of said cloggants deposited in the pores of and on said elements by reacting them with a dilute liquid aqueous acid solution in order to reduce such restriction to the flow of treating gas through said pores; said cloggant removal reaction being performed with said dilute acid solution; filling the pores of said clogged elements and their plenum chambers and said gas distribution network with said solution; maintaining a pressure behind the acid solution that fills said pores, plenum chambers and gas distribution network at a degree of pressure that is sufficient to slightly over-balance the back pressure of the aqueous pond against the surfaces of said elements in order to force the said acid solution into contact with said cloggants to allow said reaction to proceed; performing said acid-cloggant reaction intermittently on said diffusers from time to time and with such frequency on the cloggants as to rejuvenate said elements whereby to enable said elements to maintain a reasonable volume of a treating gas flow and bubble pattern in the flow of such gas from the diffusers into the pond to properly aerate the sewage dispersed therein; and then reestablishing the flow of treating gas through said gas distribution system to said rejuvenated diffusion elements to flush reaction products and any unreacted dilute acid from said gas distribution system and the pores of said diffusers and from said diffuser surfaces into said aqueous pond in order to continue said aeration sewage treatment process.

2. A process as in claim 1 wherein said gas distribution system includes a plurality of individual submerged main header means, each of said submerged main header means in said system being adapted to support a plurality of branch header means for carrying said element supporting plenums; each one of said header means being connected to an individual treating gas feed pipe that forms a part of said system with several sets of said main and branch header means constituting an under water gas release system, and said reaction is performed selectively on at least one of said main header means and the diffuser means carried by the plenums supported on the branch header means of said selected main header means.

3. A process as in claim 1 wherein said acid solution on said surfaces, in said pores, in said plenums, and in said distribution piping is agitated.

4. A process as in claim 3 wherein said agitation is produced by a controlled flow of gas into said network.

5. A process as in claim 1 wherein said acid-cloggant reaction is performed in a series of steps including at least a first phase and subsequent phase by allowing the reaction to proceed for a time period to complete a first phase acid cloggant reaction and then filling the plenums with an additional charge of acid solution to replace the volume of acid liquid deleted from said acid solution during said preceding step for performance of any subsequent phase step.

6. A process as in claim 5 wherein said acid solution in said pores and said plenums is agitated.

7. A process as in claim 6 wherein said agitation is produced by a controlled flow of gas in said network.

8. A process for rejuvenating the porous aeration domes in situ in an aqueous sewage treatment pond to remove cloggants from the pores and surfaces of the domes; said system having a piping arrangement including at least several of the conventional elements such as a drop pipe, header means, branch header means, plenum chambers for the domes and the like for delivering a treating gas under pressure from above ground to the domes situated adjacent the bottom of the pond, said treating gas being forced through the pores of said domes against the back pressure of the aqueous pond to form minute bubbles that float upwardly through the pond to aerate the sewage comprising filling said piping arrangement, its included elements, and the pores of said domes with a dilute liquid aqueous acid adapted to react with said cloggants, maintaining a pressure behind the liquid aqueous acid solution in said piping, said maintained pressure being just sufficient to overcome the back pressure of the aqueous pond against the domes, said pressure being maintained for at least one time period to permit said acid and cloggant reaction to proceed to a substantial completion, and then forcibly pumping all of said dilute liquid acid solution in said piping system through the pores of said domes and into the pond.

9. A process as in claim 8 wherein said dilute liquid acid solution is agitated as it is being forcibly pumped through said pores.

10. A process as in claim 8 wherein a portion of said liquid acid is forcibly pumped through said pores and then said maintained pressure is again established for at least one more reaction period.

11. A process as in claim 8 wherein said pressure is maintained for a time period of about one hour.

12. A process as in claim 11 wherein said pressure is maintained during each of said reaction periods.

13. A process as in claim 8 wherein said acid is a dilute liquid HCl.

14. A process as in claim 9 wherein said acid is a dilute liquid HCl.

15. A process as in claim 10 wherein said acid is dilute liquid HCl.

16. A process as in claim 11 wherein said acid is dilute liquid HCl.

17. A process as in claim 12 wherein said acid is dilute liquid HCl.

* * * * *